United States Patent Office 2,996,552
Patented Aug. 15, 1961

2,996,552
PREPARATION OF ACETYLENIC ALCOHOLS
Jack H. Blumenthal, New Monmouth, N.J., assignor to Air Reduction Company, Incorporated, New York, N.Y., a corporation of New York
No Drawing. Filed Oct. 28, 1958, Ser. No. 770,011
5 Claims. (Cl. 260—617)

This invention relates to the preparation of acetylenic alcohols and is more particularly concerned with the preparation of acetylenic alcohols by the reaction of an acetylenic hydrocarbon with a carbonyl compound in the presence of an alkali metal hydroxide.

It has been proposed that acetylenic alcohols be prepared by interreacting acetylene, a carbonyl compound, and potassium hydroxide and various solvents, such as ethers and polyethers, have been suggested as media in which this reaction may be conducted. However, such prior operations have not proved entirely satisfactory in the past and have normally required the use of potassium hydroxide as an essential component of the reaction, and the more economic sodium hydroxide could not be employed. But by far the chief disadvantage of prior processes has been the need to use stoichiometric amounts of potassium hydroxide, i.e. amounts of potassium hydroxide which were at least equimolecular with respect to the amount of acetylenic alcohol formed. The use of such large amounts of potassium hydroxide is non-economic, and requires the recovery and processing of potassium hydroxide so that it may be reused. Therefore, the economics of these prior processes are dependent, in large measure, upon the capital investment necessary to process potassium hydroxide and the amount of potassium hydroxide required in the process.

In accordance with the present invention, it has been found that acetylenic alcohols may be efficiently, and economically prepared from an acetylenic hydrocarbon and a carbonyl compound using only small or catalytic (substantially less than equimolecular) amounts of potassium hydroxide by conducting the reaction in a medium which is ethylenediamine or liquid organic sulfoxide. Since the reaction when conducted in a liquid organic sulfoxide or in ethylenediamine requires only catalytic amounts, i.e., about one-tenth the stoichiometric amount or less, it is unnecessary to recover and reprocess the potassium hydroxide used. It has also been found that when the reaction is conducted in a liquid organic sulfoxide medium or in ethylenediamine, alkali metal hydroxides other than potassium hydroxide as well as alkali metal alcoholates of tertiary acetylenic alcohols may be used, although it is preferred to employ potassium hydroxide.

The preferred acetylenic hydrocarbon for use in the invention is acetylene and in the following description of the invention reference will be limited to acetylene. However, it is to be understood that other acetylenic hydrocarbons can be employed in practice of the invention to make acetylenic alcohols. Specific examples of other acetylenic hydrocarbons are methyl acetylene, phenyl acetylene, ethyl acetylene, and the like.

The organic liquid sulfoxides which have been found suitable as the medium for conducting the reaction of acetylene and a carbonyl compound to prepare acetylenic alcohols are those organic sulfoxides which are liquid at reaction temperatures and contain no functional or reactive groups. The preferred liquid organic sulfoxides may be designated by the formula

R—S—R$_1$
‖
O wherein R and R$_1$ may be the same or different alkyl radicals or may represent methylene groups which are bonded together to form a ring structure, as in tetramethylene sulfoxide. Suitable organic liquid sulfoxides include dimethyl sulfoxide, diethyl sulfoxide, methyl ethyl sulfoxide, tetramethylene sulfoxide and the like, although dimethyl sulfoxide is preferred. Ethylenediamine is a well-known normally-liquid compound having the formula NH$_2$CH$_2$CH$_2$NH$_2$.

The liquid organic sulfoxide reaction medium and ethylene diamine can be recovered by distillation and recycled. There is essentially no loss of sulfoxide or ethylenediamine due to decomposition. The liquid organic sulfoxide or the ethylenediamine may contain small amounts of water, e.g., less than about 1%, although the presence of too much water tends to produce undesirable side reactions.

Generally, the acetylenic alcohol is prepared by presaturating the liquid organic sulfoxide or the ethylenediamine with acetylene, suspending or otherwise dispersing the alkali metal hydroxide in the liquid organic sulfoxide or ethylenediamine, and adding the carbonyl compound and acetylene. After the reaction is completed, the catalyst is neutralized, and the acetylenic alcohol obtained is separated. In a less preferred operating procedure, the carbonyl compound and alkali metal hydroxide may be dispersed in the liquid organic sulfoxide or ethylenediamine and acetylene then added. Neutralization of the reaction mixture may be accomplished by the addition of an aqueous acid solution, by carbonation with carbon dioxide, by the use of ion exchange resins, acid salts, or any of the other neutralization methods well-known in the art. The method by which the acetylenic alcohol is recovered will depend, primarily, upon the physical nature of the reaction mixture, and, generally, will involve either extraction or filtration and distillation. The reaction may be run batchwise or continuously.

While any carbonyl compound, which is soluble in the organic sulfoxide reaction medium or in ethylenediamine may be reacted with acetylene in accordance with the present invention to prepare an acetylenic alcohol, those carbonyl compounds are preferred which may be represented by the following general formula $$R_2-\overset{\overset{\displaystyle O}{\|}}{C}-R_3$$

wherein R$_2$ and R$_3$ may be the same or different radicals selected from the group consisting of hydrogen; alkyl such as methyl, ethyl, butyl, hexyl, and the like; cycloalkyl such as cyclopropyl, cyclohexyl, and the like; aryl such as phenyl, xylyl, tolyl, and the like; hydroxyalkyl such as hydroxymethyl, hydroxyethyl, and the like; hydroxycycloalkyl such as hydroxycyclohexyl (HO—C$_6$H$_{10}$—), and the like; alkoxyalkyl such as methoxymethyl (CH$_3$—O—CH$_2$—)

methoxyethyl (CH$_3$—O—C$_2$H$_4$—), ethoxybutyl (C$_2$H$_5$—O—C$_4$H$_8$—)

and the like; and at least one of R$_2$ and R$_3$ is not an aryl radical. Superior conversions, yields, and rates of reaction are obtainable with these preferred carbonyl compounds, particularly the ketones, especially in the case of ethylenediamine. In addition, it has also been found that as the carbon atoms in the radicals represented by R$_2$ and R$_3$ in the foregoing formula increase, the rate of reaction decreases. However, if either R$_2$ or R$_3$ represents a lower alkyl group (methyl or ethyl), the remaining radical R$_2$ or R$_3$ may represent an organic radical of rather long chain length (e.g. C$_{19}$ or higher) without materially decreasing the rate of reaction. Suitable carbonyl compounds include acetone, acetaldehyde, cyclohexanone, propionaldehyde, methyl ethyl ketone, paraformaldehyde, isobutyraldehyde, acetophenone, 2-methyl-2-hydroxy-3-butanone, diethyl ketone, diisobutyl ketone, diisopropyl ketone, methyl hexyl ketone, ethyl hexyl ketone, methyl cyclopropyl ketone, ethyl amyl ketone, methyl amyl ketone, and other commercially available aldehydes and ketones.

The alkali metal hydroxide employed is preferably of about 90% or higher purity and finely-divided, i.e. 80–100 mesh or higher. Less pure grades of alkali metal hydroxides or coarser alkali metal hydroxides may be used, although the reaction rate will be somewhat slower with these materials. As already pointed out above, any alkali metal hydroxide can be employed although increased conversions and yields are obtainable with potassium hydroxide and it is preferred for this reason. In addition to alkali metal hydroxides, alkali metal alcoholates of tertiary acetylenic alcohols can be employed. When such alcoholates are used in practicing the invention, it is preferred to employ an alcoholate corresponding to a tertiary acetylenic alcohol made in that particular practice of the invention. An example of a suitable alkali metal alcoholate of a tertiary acetylenic alcohol is the potassium alcoholate of methyl butynol,

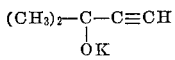

The optimum loading per liter of liquid organic sulfoxide or ethylenediamine is 0.38 to 0.5 mole of alkali metal hydroxide or alcoholate and 5.0 to 6.25 moles of carbonyl compound. The use of greater quantities of alkali metal hydroxide or alcoholate per liter of liquid organic sulfoxide or ethylenediamine leads to viscous reaction mixtures which present mechanical difficulties in carrying on the reaction. A greater loading of carbonyl compound can be used to produce more product per run and resulting in even higher conversions based on the catalyst. However, the conversions based on carbonyl compound become lower, thereby necessitating the recovery of larger quantities of carbonyl compound.

The reaction temperature will depend upon a variety of factors including the specific reactants employed, particular liquid reaction medium used, and the reaction product desired. Generally, the reaction may be conducted at a temperature of from about −10° to 80° C. Preferably, the reaction temperature is from about 0° to 40° C. if the monohydric acetylenic alcohol is desired, and from about 40° to 70° C. if the dihydric acetylenic alcohol is desired. Pressure does not appear to be a parameter in this reaction, and the reaction, therefore, is preferably conducted at atmospheric pressure, although elevated pressures may be used to obtain slight improvements in conversions.

The following specific examples will serve to further illustrate my invention:

EXAMPLE 1

*Preparation of 3-methyl-1-butyn-3-ol from acetylene, KOH, and acetone*

Dimethyl sulfoxide, 200 cc., was placed in a 500 ml., 3-neck flask fitted with a stirrer, Dry Ice condenser, dropping funnel, thermometer and gas-bubbler, and saturated with acetylene gas at 15°–20° C. Powdered (80–100 mesh) 99% pure KOH, 5.6 g. (0.1 mole) was added and the mixture stirred with acetylene for about one hour. With the acetylene bubbling into the mixture, 52.8 g. (0.91 mole) of acetone were added portionwise over a one hour period while the temperature was maintained at 15°–18° C. The reaction mixture was stirred with acetylene for another hour and then neutralized with dilute ice cold hydrochloric acid. The final pH was adjusted to 6–7, and the reaction mixture was continuously extracted with diethyl ether. The ether extract was dried over magnesium sulfate and the ether distilled off. The residue after distillation contained 54.3 g. of 3-methyl-1-butyn-3-ol. Conversion: 71% based on acetone; and 647% based on potassium hydroxide.

The procedure and apparatus used in Examples 2 through 7 were similar to that described in Example 1 above.

EXAMPLE 2

*Preparation of 3-methyl-1-butyn-3-ol from acetylene, NaOH, and acetone*

To 200 ml. of acetylene saturated dimethyl sulfoxide were added 4 g. (0.1 mole) of powdered (100 mesh) 95% pure sodium hydroxide, and the mixture was stirred with acetylene at 15° C. for about one hour. Acetone, 58 g. (1.0 mole), was added portionwise with stirring over a period of 1.4 hours. The flow of acetylene gas was stopped, and the reaction mixture was purged with carbon dioxide for twenty-five minutes. A small amount of water (3 cc.) was added and the mixture was carbonated again for thirty minutes. The mixture was filtered and brought to a pH of 6–7 with a few drops of hydrochloric acid. The crude product upon distillation will give 39.7 g. of 3-methyl-1-butyn-3-ol; a 47% conversion based on acetone.

EXAMPLE 3

*Preparation of 1-butyn-3-ol from acetylene, KOH, and acetaldehyde*

To 200 ml. of acetylene-saturated dimethyl sulfoxide were added 2.8 g. (0.05 m.) of powdered (100 mesh) KOH, and the mixture was stirred with acetylene for 1.5 hours. Acetaldehyde, 44 g. (1.0 mole), was added portionwise at 15° C. over a period of 40 minutes. The mixture was stirred with acetylene for another thirty minutes, and then neutralized with dilute hydrochloric acid. The final pH was adjusted to 6–7 and the solution was filtered. The filtrate was continuously extracted with diethyl ether. The ether layer was dried over magnesium sulfate and the ether distilled off. The residue contained 7 g. of 1-butyn-3-ol.

EXAMPLE 4

*Preparation of 1-ethynyl-cyclohexanol from acetylene, KOH, and cyclohexanone*

To 200 ml. of dimethyl sulfoxide which had been saturated with acetylene were added 6.1 g. (0.1 mole) of powdered 90% pure KOH (80 mesh). The mixture was stirred with acetylene for one hour. Cyclohexanone, 49 g. (0.5 mole), was added dropwise at 20°–25° C. over a period of 1.5 hours. The reaction mixture was stirred with acetylene for another thirty minutes and then 3.6 g. of water were added and carbon dioxide was bubbled into the mixture for one hour. The reaction mixture was filtered and adjusted to a pH of 6–7 with a few drops of hydrochloric acid. The crude product after extraction and distillation yields 56 g. of 1-ethynyl-cyclohexanol (0.45 mole), a conversion of 90% based on cyclohexanone.

EXAMPLE 5

*Preparation of 3-methyl-1-pentyn-3-ol from acetylene, KOH, and methyl ethyl ketone*

To a mixture of 5.6 g. (0.1 m.) of powdered (80 mesh) 99% pure KOH in 200 ml. of dimethyl sulfoxide which had been saturated with acetylene were added, portionwise, 72 g. (1.0 m.) of methyl ethyl ketone at 15°–18° C. over a period of forty-five minutes. The reaction mixture was stirred with acetylene for another two hours, and then carbonated for twenty-five minutes. A small amount of water (3 cc.) was added and the mixture was stirred with carbon dioxide again for another thirty minutes, and filtered. The filtrate contained 65 g. of 3-methyl-1-pentyn-3-ol, a conversion of 66% based on methyl ethyl ketone.

EXAMPLE 6

*Preparation of 1-pentyn-3-ol from acetylene, KOH, and propionaldehyde*

To a mixture of 4 g. (0.065 m.) of powdered KOH (90% pure, 100 mesh) in 200 ml. of dimethyl sulfoxide which had been saturated with acetylene were added 60 g. (1.0 m.) of propionaldehyde dropwise over a period of forty-five minutes at 13°–17° C. The reaction mixture was stirred for another thirty minutes with acetylene at room temperature, and then stirred with carbon dioxide for another thirty minutes. The reaction mixture was filtered. The filtrate contained about 9 g. of 1-pentyn-3-ol.

EXAMPLE 7

*Preparation of 3-phenyl-1-butyn-3-ol and 2,5-diphenyl-3-hexyne-2,5-diol from acetylene, KOH, and acetophenone*

To a mixture of 5 g. (0.08 m.) of powdered KOH (90% pure, 100 mesh) in 200 ml. of dimethyl sulfoxide which had been saturated with acetylene were added 60 g. (0.5 m.) of acetophenone dropwise over a period of 1.75 hours at 30°–33° C. The mixture was stirred with acetylene for another forty-five minutes, and then neutralized with dilute ice-cold hydrochloric acid. The final pH of the mixture was 6–7. The reaction mixture was then extracted with ether. The ether layer was dried over magnesium sulfate and the ether distilled off. The residue contained 30.6 g. of 3-phenyl-1-butyn-3-ol and 14 g. of 2,5-diphenyl-3-hexyne-2,5-diol (39% and 20% conversion, respectively, based on acetophenone).

EXAMPLE 8

*Preparation of 4-methyl-1-pentyn-3-ol from acetylene, KOH, and isobutyraldehyde*

The procedure used in this example is similar to that employed in Examples 1–7 above except that instead of continuously bubbling acetylene through the mixture, a slight pressure (3 to 4 cm. of Hg) of acetylene was maintained throughout the reaction.

To a mixture of 6 g. (0.1 m.) of powdered KOH (90% pure, 100 mesh) and 200 ml. of dimethyl sulfoxide which had been saturated with acetylene were added 72 g. (1.0 m.) of isobutyraldehyde, dropwise, with stirring at 15° C. over a period of two hours. The reaction mixture was stirred with acetylene for another thirty minutes. Then carbon dioxide was bubbled in for thirty minutes. The resulting mixture was filtered and the filtrate was fractionated at 80–100 mm. Hg through a 10″ vacuum jacketed column packed with stainless steel "Heli-Pak." The distilled product contained 43 g. of 4-methyl-1-pentyn-3-ol, a conversion of 45% based on isobutyraldehyde.

EXAMPLE 9

*Preparation of ethynylcyclohexanol from acetylene, KOH, and cyclohexanone*

Using generally the procedure of Example 8, ethylenediamine (222 g.) was added to the flask and saturated with acetylene for 15 minutes. KOH (6 g., 0.1 m.) was added and the mixture saturated with acetylene at 18–20° C. for 15 minutes. Cyclohexanone (75 g., 0.76 m.) was dropped in slowly with vigorous stirring over a period of one hour at 18–20° C. A slight acetylene pressure of 2–3 cm. of mercury was maintained in the system during the reaction. The reaction mixture was stirred with acetylene for another 15 minutes. The mixture was then carbonated with 6 g. (0.135 m.) of "Dry Ice" which was allowed to evaporate slowly into the closed system with vigorous stirring. The mixture was stirred for another 30 minutes and then was filtered through a medium grade sintered glass funnel. The filtrate (yellow-green) weighed 289 g.

Fractionation of the filtrate through a 10″ vacuum jacketed Vigreux column yielded ethynylcyclohexanol in an amount corresponding to a conversion of 83%.

EXAMPLE 10

*Preparation of 2,3-dimethyl-4-pentyne-2,3-diol from acetylene, KOH, and 3-methyl-3-hydroxy-2-butanone*

Again using the general procedure of Example 8, ethylenediamine (223 g.) was added to the flask and saturated with acetylene for 15 minutes. KOH (7 g., 0.11 m.) was added and the mixture again saturated with acetylene for 15 minutes. 3-methyl-3-hydroxy-2-butanone (102 g., 1.0 m.) was added dropwise with stirring at 29–31° C. over a period of 2.33 hours. A slight acetylene pressure of 2–3 cm. of mercury was maintained in the system during the reaction. The clear yellow solution was stirred with acetylene for another 30 minutes and then was carbonated with 6 g. (0.135 m.) of "Dry Ice" which was allowed to evaporate slowly into the closed system with vigorous stirring. The mixture was stirred for another 30 minutes and then filtered through a medium grade sintered glass funnel. The filtrate (yellow) weighed 296.5 g.

Fractionation of the filtrate through a 10″ vacuum jacketed Vigreux column yielded 2,3-dimethyl-4-pentyne-2,3-diol and the corresponding tetrol in amounts corresponding to 50% conversion and 25% conversion, respectively.

When this procedure was repeated at a temperature of 18–20° C. instead of 29–31° C. 56% conversion to the diol and 20% conversion to the tetrol were realized.

EXAMPLE 11

*Preparation of 1-hexyn-3-ol from acetylene, KOH, and butyraldehyde*

Using the general procedure of Example 8, dimethyl sulfoxide (218 g.) was added to the flask and saturated with acetylene at 15° C. for 15 minutes. KOH (6 g., 0.1 m.) was added and the mixture saturated with acetylene for another 15 minutes. Butyraldehyde (72 g., 1.0 m.) was dropped in slowly with stirring at 15° C. over a period of 2 hours. A slight acetylene pressure of 2–3 cm. of mercury was maintained in the system during the reaction. The solution was stirred for another 30 minutes with acetylene and then $CO_2$ was bubbled in for 30 minutes. The mixture was filtered through a medium grade sintered glass funnel. The filtrate (light brown color) weighed 285 g. Fractionation of the filtrate through a 10″ vacuum jacketed column packed with medium "Heli-Pak" yielded 1-hexyn-3-ol representing 45% conversion and an amount of the corresponding diol representing 15% conversion.

EXAMPLE 12

*Preparation of phenyl butynol from acetylene, KOH, and acetophenone*

As in the procedure of Example 8, ethylenediamine (224 g.) was added to the flask and saturated with acetylene for 15 minutes. KOH (7 g., 0.11 m.) was added and the mixture saturated with acetylene again at 15° C. Acetophenone (84 g., 0.7 m.) was added dropwise with vigorous stirring at 15–20° C. over a period of 3.3 hours. A slight acetylene pressure of 2–3 cm. of mercury was maintained in the system during the reaction. The yellow solution was stirred with acetylene for another 1.5 hours at 20° C. The solution was then carbonated with 6 g. (0.135 m.) of "Dry Ice" over a period of 30 minutes. The mixture was stirred for another 10 minutes and then filtered through a medium grade sintered glass funnel. The filtrate (orange color) weighed 275 g.

Fractionation of the filtrate through a 10″ vacuum jacketed column packed with medium "Heli-Pak" yielded phenyl butynol corresponding to a conversion of 57%.

EXAMPLE 13

*Preparation of propargyl alcohol and 2-butyn-1,4-diol from acetylene, KOH, and paraformaldehyde*

The apparatus used was similar to that used in Examples 1–7, above, except that the acetylene source was an 80-liter, stainless steel gasometer from which the acetylene was drawn on demand through two drying towers.

To a mixture of 9 g. (0.15 m.) of powdered KOH (90% pure, 100 mesh) and 200 ml. of dimethyl sulfoxide which had been saturated with acetylene were added 30 g. (0.95 m.) of paraformaldehyde, in increments, with stirring at 15°–17° C. over a period of one hour. The gasometer was disconnected and acetylene was bubbled in, with stirring, for thirty minutes. Carbon dioxide gas was then added for thirty minutes to neutralize the catalyst.

The resulting mixture was filtered and the filtrate was fractionated at 20–100 mm. Hg through a 10" vacuum-jacketed Vigreux column. The distilled product contained 21.6 g. of propargyl alcohol and 3.8 g. of 2-butyn-1,4-diol, a conversion of 40% and 9% respectively, based on paraformaldehyde.

When the foregoing reaction was run at 10 p.s.i.g. acetylene pressure, the paraformaldehyde being added all at once, a 41% and 18% conversion to propargyl alcohol and 1,4-butynediol, respectively was obtained.

It should be understood that the foregoing examples are merely illustrative and that various modifications thereof can be made without departing from the spirit and scope of this invention. For example, other acetylenic alcohols may be prepared from other carbonyl compounds. The ratio of dihydric acetylenic alcohol obtainable can be increased by conducting the reaction at higher temperatures as more fully described above, other liquid organic sulfoxides can be used, other acetylenic hydrocarbons can be used, and still other other modifications will suggest themselves to those skilled in the art. The term "acetylenic alcohol" as used herein and in the appended claims is intended to refer to both the monohydric and dihydric acetylenic alcohols. The invention is not to be limited except as defined in the appended claims.

This application is a continuation-in-part of my copending application Serial No. 641,797, filed February 25, 1957, now abandoned.

What is claimed is:

1. In a process for preparing an acetylenic alcohol by the reaction of an organic carbonyl compound selected from the group consisting of aldehydes and ketones with an acetylenic hydrocarbon in the presence of an alkali metal compound selected from the group consisting of alkali metal hydroxides and alkali metal alcoholates of tertiary acetylenic alcohols, the improvement which comprises carrying out the reaction in a reaction medium selected from the group consisting of ethylenediamine and a liquid organic sulfoxide selected from the group consisting of dimethyl sulfoxide, diethyl sulfoxide, methyl ethyl sulfoxide, and tetramethylene sulfoxide in the presence of an amount of said alkali metal compound substantially less than equimolecular with respect to the amount of said carbonyl compound.

2. In a process for preparing an acetylenic alcohol by the reaction of an organic carbonyl compound selected from the group consisting of aldehydes and ketones with an acetylenic hydrocarbon in the presence of an alkali metal compound selected from the group consisting of alkali metal hydroxides and alkali metal alcoholates of tertiary acetylenic alcohols, the improvement which comprises carrying out the reaction in a reaction medium selected from the group consisting of ethylenediamine and a liquid organic sulfoxide selected from the group consisting of dimethyl sulfoxide, diethyl sulfoxide, methyl ethyl sulfoxide, and tetramethylene sulfoxide in the presence of about 0.05 to about 0.2 mole of said alkali metal compound per mole of said carbonyl compound.

3. In a process for preparing an acetylenic alcohol by the reaction of an organic carbonyl compound selected from the group consisting of aldehydes and ketones with acetylene in the presence of an alkali metal hydroxide, the improvement which comprises carrying out the reaction in dimethyl sulfoxide in the presence of an amount of said alkali metal hydroxide substantially less than equimolecular with respect to the amount of said carbonyl compound.

4. In a process for preparing an acetylenic alcohol by the reaction of an organic carbonyl compound selected from the group consisting of aldehydes and ketones with acetylene in the presence of an alkali metal hydroxide, the improvement which comprises carrying out the reaction in dimethyl sulfoxide in the presence of about 0.65 to about 0.2 mole of said alkali metal hydroxide per mole of said carbonyl compound.

5. The process of claim 4 in which the alkali metal hydroxide is potassium hydroxide.

References Cited in the file of this patent

UNITED STATES PATENTS

| 2,435,524 | Weizmann | Feb. 3, 1948 |
| 2,468,982 | Jansen | May 3, 1949 |
| 2,487,007 | Walker et al. | Nov. 1, 1949 |
| 2,539,871 | Smedslund | Jan. 30, 1951 |

OTHER REFERENCES

Campbell et al.: "Jour. Amer. Chem. Soc.," volume 60, pages 2882–84 (3 pages) (December 1938).

UNITED STATES PATENT OFFICE
CERTIFICATE OF CORRECTION

Patent No. 2,996,552                 August 15, 1961

Jack H. Blumenthal

It is hereby certified that error appears in the above numbered patent requiring correction and that the said Letters Patent should read as corrected below.

Column 7, line 27, strike out "other", second occurrence; column 8, line 32, for "0.65" read -- 0.05 --.

Signed and sealed this 9th day of January 1962.

(SEAL)
Attest:

ERNEST W. SWIDER
Attesting Officer

DAVID L. LADD
Commissioner of Pate